(12) United States Patent
Gebhard et al.

(10) Patent No.: US 6,660,801 B1
(45) Date of Patent: Dec. 9, 2003

(54) COATING COMPOSITION WITH IMPROVED ADHESION TO FRIABLE SURFACE

(75) Inventors: Matthew Stewart Gebhard, New Britain, PA (US); Bradley Keith Hageman, Pottstown, PA (US)

(73) Assignee: Rohm and Haas Company, Philadelphia, PA (US)

(*) Notice: Subject to any disclaimer, the term of this patent is extended or adjusted under 35 U.S.C. 154(b) by 0 days.

(21) Appl. No.: 09/552,877

(22) Filed: Apr. 20, 2000

(51) Int. Cl.$^7$ .................... C08L 31/00; C08L 33/02
(52) U.S. Cl. .................. 524/556; 524/238; 524/243; 524/245; 524/543; 524/558; 524/560; 524/563
(58) Field of Search ................. 524/238, 245, 524/243, 543, 556, 558, 560, 563

(56) References Cited

U.S. PATENT DOCUMENTS

| | | | |
|---|---|---|---|
| 3,878,152 A | * 4/1975 | Distler et al. | 260/29.6 XA |
| 4,351,754 A | * 9/1982 | Dupre | 524/445 |
| 4,771,100 A | 9/1988 | Das et al. | 525/714 |
| 5,270,380 A | 12/1993 | Adamson et al. | 524/556 |
| 5,331,042 A | 7/1994 | Charmot et al. | 524/556 |
| 5,623,085 A | 4/1997 | Gebhard et al. | 560/25 |

FOREIGN PATENT DOCUMENTS

| | | |
|---|---|---|
| EP | 0 916707 A1 | 11/1998 |
| FR | 644 205 A1 | 3/1995 |
| WO | WO 95/09209 | 4/1995 |
| WO | WO 98/54256 | 5/1998 |

* cited by examiner

*Primary Examiner*—Judy M. Reddick
(74) *Attorney, Agent, or Firm*—Ronald D. Bakule

(57) ABSTRACT

An aqueous coating composition having improved adhesion to friable surfaces including an emulsion polymer of certain compositions and certain acid numbers having a glass transition temperature of −20 C to 100 C and an average particle diameter less than 120 nanometers; and 0.25–10%, by weight based on emulsion polymer weight, water-soluble alkoxylated amine is provided. In addition a method for for improving adhesion to friable surfaces by using the aqueous coating compositions of the invention is provided.

5 Claims, No Drawings

COATING COMPOSITION WITH IMPROVED ADHESION TO FRIABLE SURFACE

This invention relates to an aqueous coating composition having improved adhesion to friable surfaces such as chalky weathered paint surfaces and masonry surfaces. More particularly, this invention relates to an aqueous coating composition including an emulsion polymer of selected composition having a glass transition temperature (Tg) of −20 C to 100 C and an average particle diameter less than 120 nanometers, and 0.25–10 wt. % of a water-soluble alkoxylated amine. And the invention relates to a method for improving the adhesion of a dried aqueous coating composition to a friable surface by forming an aqueous coating composition including an emulsion polymer of selected composition having a glass transition temperature (Tg) of −20 C to 100 C and an average particle diameter less than 120 nanometers, and 0.25–10% of a water-soluble alkoxylated amine; applying the aqueous coating composition to a friable surface; and drying, or allowing to dry, the aqueous coating composition.

The present invention serves to provide a dried coating which has improved adhesion to a friable surface. Coatings are frequently desirably applied to surfaces which are both porous and weak, i.e., subject to attrition on abrasion such as, for example, chalky surfaces of coatings which have weathered to an extent that poorly consolidated pigment forms a surface layer on the coating and masonry surfaces, weathered or not, which have a poorly consolidated surface. A substrate to which a coating is applied may have an entirely friable surface or only portions of the surface may be friable. Such substrates present a problem to the applicator in that, without being bound by this mechanism, the aqueous coating composition may not penetrate the weak boundary layer of the friable surface or friable surface areas sufficiently to provide a dry coating with the requisite degree of adhesion to the substrate below the weak surface.

U.S. Pat. No. 4,771,100 discloses the use of ethoxylated fatty amines in the preparation of latexes containing about 0.1 to 10 weight percent of copolymerized carboxylic acid monomer which have particle sizes between 889 and 1091 Angstroms for use as coatings. Improved adhesion to friable surfaces is desired.

Adhesion to a substrate to which it has been applied is a generally desirable characteristic of a coating. However, some surfaces are notoriously difficult to adhere to and coatings which adhere well to sound surfaces will fail to adhere to such surfaces. One such difficult surface is a friable surface, that is, one on which a weak, poorly bound, inadequately consolidated surface layer such as a badly chalking weathered paint surface or a brittle, crumbling masonry surface, is to be coated. The problem faced by the inventors is the provision of a suitable aqueous coating composition and a method for improving the adhesion of a coating so that that adhesion to friable surfaces can be effected. We have now found that that certain polymer compositions used in conjunction with water-soluble alkoxylated amines provide improved adhesion to friable surfaces relative to alternative compositions.

In a first aspect of the present invention there is provided an aqueous coating composition having improved adhesion to friable surfaces including an emulsion polymer having a glass transition temperature of −20 C to 100 C and an average particle diameter less than 120 nanometers, the emulsion polymer having at least one copolymerized ethylenically unsaturated nonionic monomer, each of the nonionic monomer(s) having a water solubility less than 8%, and at least one copolymerized acid monomer, such that the acid number of the emulsion polymer is 30 to 100; and 0.25–10%, by weight based on the emulsion polymer weight, water-soluble alkoxylated amine.

In a second aspect of the present invention there is provided an aqueous coating composition having improved adhesion to friable surfaces including an emulsion polymer having a glass transition temperature of −20 C to 100 C and an average particle diameter less than 120 nanometers, the emulsion polymer having 8–99.5%, by weight based on the weight of the emulsion polymer, of at least one copolymerized ethylenically unsaturated first nonionic monomer, each of the first nonionic monomer(s) having a water solubility of 8% or more, 0–91.5%, by weight based on the weight of the emulsion polymer, of at least one copolymerized ethylenically unsaturated second nonionic monomer, each of the second nonionic monomer(s) having a water solubility of less than 8%, and at least one copolymerized acid monomer, such that the acid number of the emulsion polymer is 4 to 100; and 0.25–10%, by weight based on the emulsion polymer weight, water-soluble alkoxylated amine.

In a third aspect of the present invention there is provided a method for improving the adhesion of a dried aqueous coating composition to a friable surface including forming an aqueous coating composition including an emulsion polymer having a glass transition temperature of −20 C to 100 C and an average particle diameter less than 120 nanometers, the emulsion polymer having at least one copolymerized ethylenically unsaturated nonionic monomer, each of said nonionic monomer(s) having a water solubility less than 8%, and at least one copolymerized acid monomer, such that the acid number of the emulsion polymer is 30 to 100, and 0.25–10%, by weight based on polymer weight, water-soluble alkoxylated amine; applying the aqueous coating composition to a surface; and drying, or allowing to dry, the aqueous coating composition.

In a fourth aspect of the present invention there is provided a method for improving the adhesion of a dried aqueous coating composition to a friable surface by forming an aqueous coating composition including an emulsion polymer having a glass transition temperature of −20 C to 100 C and an average particle diameter less than 120 nanometers, the emulsion polymer having 8–99.5%, by weight based on the weight of the emulsion polymer, of at least one copolymerized ethylenically unsaturated first nonionic monomer, each of the first nonionic monomer(s) having a water solubility of 8% or more, 0–91.5%, by weight based on the weight of the emulsion polymer, of at least one copolymerized ethylenically unsaturated second nonionic monomer, each of the second nonionic monomer(s) having a water solubility of less than 8%, and at least one copolymerized acid monomer, such that the acid number of the emulsion polymer is 4 to 100, and 0.25–10%, by weight based on polymer weight, water-soluble alkoxylated amine; applying the aqueous coating composition to a surface; and drying, or allowing to dry, the aqueous coating composition The aqueous coating composition contains a waterborne emulsion polymer. The emulsion polymer contains at least one copolymerized nonionic ethylenically-unsaturated monomer, such as, for example, a (meth)acrylic ester monomer including methyl acrylate, ethyl acrylate, butyl acrylate, 2-ethylhexyl acrylate, decyl acrylate, methyl methacrylate, butyl methacrylate, hydroxyethyl methacrylate, hydroxypropyl methacrylate, aminoalkyl (meth)acrylate; styrene or substituted styrenes; butadiene; vinyl acetate or other vinyl esters; vinyl monomers such as vinyl chloride, vinylidene chloride, N-vinyl pyrollidone; (meth)acrylonitrile and (meth)acrylamide. The use of the term "(meth)" followed by another term such as acrylate or acrylamide, as used throughout the disclosure, refers to both acrylates and acrylamides and methacrylates and methacrylamides, respectively.

The water solubility of the nonionic monomers incorporated into the emulsion polymers herein are defined as those determined using the Quantitative Structural Activity Relationship (QSAR) program. The program uses the molecular structure to estimate physical-chemical properties including, molecular weight, vapor pressure, solubility, bioconcentration factor, hydrolysis half-life, Henry's coefficient, partitioning data, and other parameters( based on Lyman, W., Reehl, W., and Rosenblatt, D. Handbook of Chemical Property Estimation Methods. Chapter 2 "Solubility in Water". McGraw Hill Book Co., New York, 1982). The QSAR database used to calculate the water solubility assessment is maintained by the Institute for Process Analysis, Montana State University (Bozeman, Mont., USA) and accessed through Tymnet Data Systems and Numerica Online Systems (Numericom. 1994. The Online Interface for Numerica Users. Technical Data Base Services, Inc. (TDS, 135 West 50th Street, New York, N.Y. 10020). Some water solubilities are presented in Table 1.

TABLE 1

Water solubilities of monomers

| Monomer | Water Solubility by QSAR Method (grams per 100 grams of water) |
|---|---|
| BA | 0.465 |
| EA | 2.88 |
| EHA | 0.0172 |
| MMA | 4.17 |
| Sty | 0.0672 |
| VA | 9.65 |
| AAEM | 8.00 |

The emulsion polymer has a certain acid number range resulting from at least one copolymerized monoethylenically-unsaturated acid monomer such as, for example, acrylic acid, methacrylic acid, crotonic acid, itaconic acid, sulfoethyl methacrylate, phosphoroethyl methacrylate, fumaric acid, maleic acid, monomethyl itaconate, monomethyl fumarate, monobutyl fumarate, and maleic anhydride. The acid number of the emulsion polymer of the first and third aspects of the present invention is 30 to 100, preferably 30 to 50, more preferably 39 to 50. The acid number of the emulsion polymer of the second and fourth aspects of the present invention is 4 to 100, preferably 8 to 50.

The emulsion polymer used in this invention is substantially thermoplastic, or substantially uncrosslinked, when it is applied to the surface, although low levels of deliberate or adventitious crosslinking may be present. When low levels of precrosslinking or gel content are desired low levels of nonionic multi-ethylenically unsaturated monomers such as, for example, 0.1%–5%, by weight based on the weight of the emulsion-polymerized polymer, allyl methacrylate, diallyl phthalate, 1,3-butylene glycol dimethacrylate, 1,6-hexanedioldiacrylate, and divinyl benzene may be used. It is important, however, that the quality of the film formation is not materially impaired.

The polymerization techniques used to prepare emulsion polymers are well known in the art. In the preparation of emulsion polymers conventional surfactants may be used such as, for example, anionic and/or nonionic emulsifiers such as alkali or ammonium alkyl sulfates, alkyl sulfonic acids, fatty acids, and oxyethylated alkyl phenols. The amount of surfactant used is usually up to 6% by weight, based on the weight of total monomer. Either thermal or redox initiation processes may be used. Conventional free radical initiators may be used such as, for example, hydrogen peroxide, t-butyl hydroperoxide, and ammonium and/or alkali persulfates, typically at a level of 0.05% to 3.0% by weight, based on the weight of total monomer. Redox systems using the same initiators coupled with a suitable reductant such as, for example, sodium bisulfite may be used at similar levels. Chain transfer agents such as, for example, alkyl mercaptans may be used in order to moderate the molecular weight of the polymer.

In another aspect of the present invention the emulsion polymer may be prepared by a multistage emulsion polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometries such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase. Each of the stages of the multi-staged emulsion polymer may contain the same monomers, surfactants, chain transfer agents, etc. as disclosed herein-above for the emulsion polymer. In the case of a multi-staged polymer particle the Tg for the purpose of this invention is to be calculated by the Fox equation as detailed herein using the overall composition of the emulsion polymer without regard for the number of stages or phases therein. Similarly, compositional quantities for a multi-staged polymer particle such as, for example, the amount of first nonionic monomer and the acid number shall be determined from the overall composition of the emulsion polymer without regard for the number of stages or phases therein. The polymerization techniques used to prepare such multistage emulsion polymers are well known in the art such as, for example, U.S. Pat. Nos. 4,325,856; 4,654,397; and 4,814,373.

The emulsion polymer has an average particle diameter less than 120 nanometers, preferably less than 100 nanometers, more preferably less than 80 nanometers, most preferably less than 70 nanometers. Particle sizes herein are those determined using a Brookhaven Model BI-90 particle sizer manufactured by Brookhaven Instruments Corporation, Holtsville N.Y. Reported as "effective diameter".

The glass transition temperature ("Tg") of the emulsion polymer is −20° C. to 100° C. Tgs used herein are those calculated by using the Fox equation (T. G. Fox, Bull. Am. Physics Soc., Volume 1, Issue No. 3, page 123(1956)). that is, for calculating the Tg of a copolymer of monomers M1 and M2, $$1/Tg(\text{calc.}) = w(M1)/Tg(M1) + w(M2)/Tg(M2)$$

wherein

Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2, all temperatures being in °K.

The glass transition temperatures of homopolymers may be found, for example, in "Polymer Handbook", edited by J. Brandrup and E. H. Immergut, Interscience Publishers.

The aqueous coating composition contains 0.25–10 wt. %, preferably 0.5–8 wt. %, more preferably 1–8 wt. %, of a water-soluble alkoxylated amine, by which is meant herein an amine substituted with one, two, or three $-(RO)_xR'$ groups, where R is $C_1-C_4$ alkyl or mixtures thereof, mixtures disposed randomly or in sequences (blocks), preferably ethyl, and where x is from 5–100. Further, the amine may be substituted with 0–2 R" groups, where R" is a $C_1-C_{24}$ alkyl, aralkyl, or aromatic group, preferably each R" group is a $C_1-C_{24}$ alkyl selected such that the Iodine number of the water-soluble alkoxylated amine is less than 30, more preferably such that the Iodine number of the water-soluble alkoxylated amine is less than 15, inorder to minimize the color of the alkoxylated amine. Preferred are t-amines. In any event the alkoxylated amine is water-soluble at least to the amount that it is utilized in the aqueous coating composition at 25 C. Typical alkoxylated amines are the commercially available alkoxylated t-amines, Ethox SAM-50, Ethomeen 18/25, and the primary alkoxylated amine, Jeffamine M-2070.

The amount of pigment in the aqueous coating composition may vary from a pigment volume concentration (PVC) of 0 to 75 and thereby encompass coatings otherwise described, for example, as clear coatings, semi-gloss or gloss coatings, flat coatings, and primers.

The aqueous coating composition is prepared by techniques which are well known in the coatings art. First, if the coating composition is to be pigmented, at least one pigment is well dispersed in an aqueous medium under high shear such as is afforded by a COWLES® mixer or, in the alternative, at least one predispersed pigment may be used. Then the emulsion polymer, selected surfactant and alkyl polyglycoside is added under low shear stirring along with other coatings adjuvants as desired. Alternatively, either or both of the selected surfactant and alkyl polyglycoside may have been previously added to the emulsion polymer before, during, or subsequent to the preparation of the emulsion polymer. Alternatively, the emulsion polymer may be present during the pigment dispersion step. The aqueous coating composition may contain conventional coatings adjuvants such as, for example, emulsifiers, buffers, neutralizers, coalescents, thickeners or rheology modifiers, freeze-thaw additives, wet-edge aids, humectants, wetting agents, biocides, antifoaming agents, colorants, waxes, and anti-oxidants. The aqueous coating composition may contain up to 75%, by weight based on the total dry weight of the polymer, of an emulsion polymer not meeting the limitations of the emulsion polymer of the first or second aspect of the present invention.

The solids content of the aqueous coating composition may be from 25% to 60% by volume. The viscosity of the aqueous polymeric composition may be from 50 KU (Krebs Units) to 120 KU as measured using a Brookfield Digital viscometer KU-1; the viscosities appropriate for different application methods vary considerably.

The presence and amount of friable material on a surface can be determined using the method of ASTM test method D-659. In this test method the lower the rating the more friable material present. The dry coating compositions of this invention have been evaluated and are beneficially used over substrates having surfaces with a rating of 3 or less. A "friable surface" herein is defined as one which has a rating of 3 or less determined by the above method. An alternative approach to determining the presence and amount, actually the depth, of friable material, is to repeatedly adhere a piece of tape onto an area of the surface and remove the friable material. This is continued until no more friable material is visually detected on the tape. At that point the depth can be determined quantitatively by using a suitable microscopic technique such as scanning electron microscopy. Using this test method we found that the test substrates of the examples had at least 10 microns of friable material on their surfaces.

Conventional coatings application methods such as, for example, brushing, rolling, and spraying methods such as, for example, air-atomized spray, air-assisted spray, airless spray, high volume low pressure spray, and air-assisted airless spray may be used in the method of this invention. The aqueous coating composition may be advantageouly applied to substrates such as, for example, weathered paint and friable cementitious substrates such as, for example, stucco and mortar but may also be applied to other architectural substrates. Drying is typically allowed to proceed under ambient conditions such as, for example, at 0° C. to 35° C.

The following examples are presented to illustrate the invention and the results obtained by the test procedures. The abbreviations listed below are used throughout the examples.

| | | | |
|---|---|---|---|
| AA = | Acrylic Acid | AAEM = | 2-(Actetoacetoxy) ethyl methacrylate |
| BA = | Butyl Acrylate | EHA = | 2-Ethylhexyl Acrylate |
| MMA = | Methyl Methacrylate | MAA = | Methacrylic Acid |
| STY = | Styrene | n-DDM = | n-Dodecyl Mercaptan |
| VA = | Vinyl Acetate | ALS = | Ammonium lauryl sulfate (28% active) |
| | | SLS = | Sodium lauryl sulfate (28% active) |

All polymerization examples were carried out in a four-neck, round bottom glass flask equipped with a mechanical blade stirrer, a thermocouple to monitor temperature, a reflux condenser, and a means to heat and cool.

EXAMPLE 1

Preparation of Emulsion Polymer

A 5L flask was charged with 2016 g deionized water and heated to 87° C. while being swept with $N_2$. A monomer pre-emulsion was prepared from 395 g deionized water, 12.9 g SLS, 1.5 g of sodium carbonate, 668.4 g BA, 459.6 g MMA and 72 g MAA. 150 g SLS and 2.99 g of ammonium persulfate were added to the flask along with 132 g deionized water. The monomer pre-emulsion was then added over 1.5 hours at 83° C. Over the course of the reaction, 0.66 g ammonium persulfate dissolved in 92 g deionized water was also added to the flask in a separate stream. When the additions were complete, 54 g deionized water was added. The flask was cooled and 0.9 g 70% aqueous t-butyl hydroperoxide, 0.45 g sodium formaldehyde sulfoxylate and a trace of iron sulfate heptahydrate were added in a total of 64 g of deionized water. The emulsion polymer had a solids content of 30.2% by weight, a particle size of 19 nm and a pH of 5.1.

EXAMPLE 2

Preparation of Emulsion Polymer

A 5L flask was charged with 1461 g deionized water and heated to 87° C. while being swept with $N_2$. A monomer pre-emulsion was prepared from 493.6 g deionized water, 16.1 g SLS, 835.5 g BA, 574.5 g MMA and 90 g MAA. 17.7 g SLS, 1.9 g sodium carbonate and 3.74 g of ammonium persulfate were added to the flask along with 165 g deionized water. The monomer pre-emulsion was then added over 1.5 hours at 83° C. Over the course of the reaction, 0.82 g ammonium persulfate dissolved in 115 g deionized water was also added to the flask in a separate stream. When the additions were complete, 67 g deionized water was added. The flask was cooled and 1.1 g 70% aqueous t-butyl hydroperoxide, 0.56 g sodium formaldehyde sulfoxylate and a trace of iron sulfate heptahydrate were added in a total of 75 g deionized water. The emulsion polymer had a solids content of 38.5% by weight, a particle size of 76 nm and a pH of 5.1.

EXAMPLES 3–7

Preparation of Emulsion Polymers

The polymerization procedure of Example 2 was followed, with the exception that various amounts of sodium lauryl sulfate (SLS) were added to the reaction kettle prior to monomer additions. The amounts and emulsion polymer characterization are presented in Table 3.1

Table 3.1 SLS amounts used in and characterization of Examples 3–7

TABLE 3.1

SLS amounts used in and characterization of Examples 3–7

| EXAMPLE | g SLS | Wt. % solids | Particle Size in nm | pH |
|---|---|---|---|---|
| 3 | 49.3 | 38.3 | 47 | 5.0 |
| 4 | 8.04 | 38.5 | 95 | 5.0 |
| 5 | 3.96 | 38.5 | 118 | 5.1 |
| 6 | 2.04 | 38.7 | 186 | 5.3 |
| 7 | 1.02 | 38.7 | 269 | 5.1 |

EXAMPLE 8

Preparation of Emulsion Polymer

The polymerization procedure of Example 2 was followed, with the exception that the monomer pre-emulsion was prepared with the following monomer charges: 835.5 g BA, 300 g MMA, 274.5 g STY, 90 g MAA. The emulsion polymer had a solids content of 38.2% by weight, a particle size of 78 nm and a pH of 5.3.

EXAMPLE 9

Preparation of Emulsion Polymer

The polymerization procedure of Example 2 was followed, with the exception that the monomer pre-emulsion was prepared with the following monomer charges: 757.5 g BA, 532.5 g MMA, 120 g AAEM, 90 g MAA. The emulsion polymer had a solids content of 38.3% by weight, a particle size of 83 nm and a pH of 5.0.

EXAMPLE 10

Preparation of Emulsion Polymer

A 5L flask was charged with 1614 g deionized water and heated to 89° C. while being swept with $N_2$. A monomer pre-emulsion was prepared from 1080 g deionized water, 10.6 g SLS, 743 g EA, 553 g MMA, 114 g AAEM, and 19 g MAA. 16 g SLS, 5.5 g ammonium persulfate, and 2.8% of the pre-emulsion were added to the flask along with 110 g deionized water. The remainder of the monomer pre-emulsion was then added over 1.5 hours at 84–85° C. When the additions were complete, 30 g of deionized water was added. The flask was cooled and 0.7 g of 70% aqueous t-butyl hydroperoxide, 0.4 g isoascorbic acid and a trace of iron sulfate heptahydrate were added in a total of 36.3 g deionized water. After the reaction mixture cooled to room temperature, 10 g ammonium hydroxide was added. The emulsion polymer had a solids content of 32.9% by weight, a particle size of 80 nm and a pH of 8.4.

EXAMPLE 11

Preparation of Emulsion Polymer

A 5L flask was charged with 1461 g of deionized water and heated to 87° C. while being swept with $N_2$. A monomer pre-emulsion was prepared from 494 g deionized water, 16.1 g ALS, 768 g EHA, 575 g MMA, 37 g STY, 120 g MAA, and 8.5 g n-DDM. 120 g ALS, 2.5 g sodium carbonate, and 3.7 g ammonium persulfate were added to the flask along with 165 g deionized water. The monomer pre-emulsion was then added over 1.5 hours at 83° C. Over the course of the reaction, 0.8 g ammonium persulfate dissolved in 115 g deionized water was also added to the flask in a separate stream. When the additions were complete, 67 g deionized water was added. The flask was cooled and 1.1 g of 70% aqueous t-butyl hydroperoxide, 0.6 g sodium formaldehyde sulfoxylate and a trace of iron sulfate heptahydrate were added in a total of 80 g deionized water. After the reaction mixture cooled to room temperature, 13 g ammonium hydroxide in 45 g deionized water was added. The emulsion polymer had a solids content of 37.3% by weight, a particle size of 45 nm and a pH of 6.4.

EXAMPLE 12

Preparation of Emulsion Polymer

A 5L flask was charged with 1461 g deionized water and heated to 87° C. while being swept with $N_2$. A monomer pre-emulsion was prepared from 494 g deionized water, 16.1 g ALS, 721.5 g EHA, 715.5 g MMA, 37.5 g STY, 25.5 g MAA, and 8.5 g n-DDM. 120 g ALS, 0.5 g sodium carbonate, and 3.7 g ammonium persulfate were added to the flask along with 165 g deionized water. The monomer pre-emulsion was then added over 1.5 hours at 83° C. Over the course of the reaction, 0.8 g ammonium persulfate dissolved in 115 g deionized water was also added to the flask in a separate stream. When the additions were complete, 67 g of deionized water was added. The flask was cooled and 1.1 g 70% aqueous t-butyl hydroperoxide, 0.6 g sodium formaldehyde sulfoxylate and a trace of iron sulfate heptahydrate were added in a total of 80 g deionized water. After the reaction mixture cooled to room temperature, 13 g ammonium hydroxide in 45 g deionized water was added. The emulsion polymer had a solids content of 34.4% by weight, a particle size of 40 nm and a pH of 6.5.

EXAMPLE 13

Preparation of Emulsion Polymer

A 5L flask was charged with 1428 g deionized water and heated to 84° C. while being swept with $N_2$. A monomer pre-emulsion was prepared from 476 g deionized water, 18.2 g SLS, 520.2 g BA, 1161.1 g VA and 18.7 g AA. 35.7 g SLS, 1.7 g sodium bicarbonate, and 4.2 g ammonium persulfate were added to the flask along with 168 g deionized water. The monomer pre-emulsion was then added over 3 hours at 80° C. Over the course of the reaction, 0.9 g ammonium persulfate dissolved in 57 g deionized water was also added to the flask in a separate stream. When the additions were complete, 68 g deionized water was added. The flask was cooled and 1.8 g 70% aqueous t-butyl hydroperoxide, 0.8 g sodium formaldehyde sulfoxylate and a trace of iron sulfate heptahydrate were added in a total of 46 g deionized water. The emulsion polymer had a solids content of 42.5% by weight, a particle size of 78 nm and a pH of 3.6.

EXAMPLE 14

Preparation of Emulsion Polymer

A 5L flask was charged with 1461 g deionized water and heated to 85° C. while being swept with $N_2$. A monomer pre-emulsion was prepared from 493.6 g deionized water, 16.1 g SLS, 468 g BA, 942 g of VA and 90 g MAA. 17.7 g SLS, 1.5 g sodium bicarbonate and 3.74 g of ammonium persulfate were added to the flask along with 165 g deionized water. The monomer pre-emulsion was then added over 3 hours at 80° C. Over the course of the reaction, 0.82 g ammonium persulfate dissolved in 115 g deionized water was also added to the flask in a separate stream. When the additions were complete, 67 g deionized water was added. The flask was cooled and 1.1 g 70% aqueous t-butyl hydroperoxide, 0.56 g sodium formaldehyde sulfoxylate and a trace of iron sulfate heptahydrate were added in a total of 75 g deionized water. The emulsion polymer had a solids content of 38.1% by weight, a particle size of 88 nm and a pH of 3.5.

EXAMPLE 15

Preparation of Aqueous Coating Compositions

Using the ingredients given in Table 15.1 an aqueous coating composition was prepared. The grind premix was made and mixed on a high speed Cowles disperser for 20 minutes. The grind premix was transferred to another container and the let down ingredients were added in the order given. The final volume solids of the paint was 30 percent and the pigment volume concentration was 35%.

TABLE 15.1

Ingredients used in aqueous coatings composition

| Material | Weight (grams) |
|---|---|
| Grand Premix | |
| Water | 50 |
| Tamol 165 (Rohm and Haas) | 4.04 |
| Ti-Pure R-960 (DuPont) | 24.2 |
| Atomite (Thompson, Weinman &Co) | 20.7 |
| Beaverwhite (Luzenac America) | 21.9 |
| Attagel 50 (Engelhard Minerals and Chemicals) | 0.96 |
| Acrysol RM-1020 (Rohm and Haas) | 1.70 |
| Drew L-475 (Drew Chemical Company) | 0.64 |
| Let Down | |
| Emulsion polymer of Example 1 | 120.3 |
| Alkoxylated amine (Ethox SAM-50; 25% | 7.1 |

TABLE 15.1-continued

Ingredients used in aqueous coatings composition

| Material | Weight (grams) |
|---|---|
| in water from Ethox Chemicals) | |
| Propylene glycol | 11.2 |
| Texanol (Eastman Chemical) | 4.7 |
| Drew L-475 (Drew Chemical Company) | 1.3 |
| Acrysol TT-615 (Rohm and Haas) | 0.8 |
| Aq. Ammonium Hydroxide (28%) | 0.3 |
| Acrysol RM-1020 (Rohm and Haas) | 2.1 |
| Acrysol RM-825 (Rohm and Haas) | 1.2 |
| Water | 3 |

EXAMPLES 16–31 and Comparative Examples A–D

Preparation of Aqueous Coating Compositions

Using the same procedure as for Example 15, Examples 16–31 and Comparative Examples A–D were prepared. Table 16.1 lists the differences from Example 15 for each Example. As with Example 15 the PVC was 35 percent and the Volume Solids was 30 percent for each of Examples 16–31 and Comparative Examples A–D.

TABLE 16.1

Ingredients Used in Aqueous Coating Compositions Examples 16–35

| Example | Emulsion polymer of Example No. | Weight % Alkoxylated amine, based on Polymer | Alkoxylated amine |
|---|---|---|---|
| 16 | 3 | 4% | Ethox SAM-50 |
| 17 | 2 | 4% | Ethox SAM-50 |
| 18 | 4 | 4% | Ethox SAM-50 |
| 19 | 5 | 4% | Ethox SAM-50 |
| Comparative A | 6 | 4% | Ethox SAM-50 |
| Comparative B | 7 | 4% | Ethox SAM-50 |
| 20 | 2 | 2% | Ethox SAM-50 |
| 21 | 2 | 1% | Ethox SAM-50 |
| 22 | 2 | 0.5% | Ethox SAM-50 |
| Comparative C | 2 | 0% | None |
| 23 | 2 | 4% | Ethomeen 18/25 (Akzo) |
| 24 | 2 | 4% | Jeffamine M-2070 (Huntsman) |
| 25 | 11 | 4% | Ethox SAM-50 |
| Comparative D | 12 | 4% | Ethox SAM-50 |
| 26 | 10 | 4% | Ethox SAM-50 |
| 27 | 13 | 4% | Ethox SAM-50 |
| 28 | 8 | 4% | Ethox SAM-50 |
| 29 | 9 | 4% | Ethox SAM-50 |
| 30 | 9 | 4% | Jeffamine M-2070 |
| 31 | 14 | 4% | Ethox SAM-50 |

EXAMPLES 32–34 and Comparative Example E

Preparation of Aqueous Coating Compositions

Using the same procedure as for Example 15, Examples 32–34 and Comparative Example E were prepared. For Examples 33–34, the emulsion polymers were mixed prior to making the aqueous coating composition. As with Example 15 the PVC was 35 percent and the Volume Solids was 30 percent. Table 32.1 lists the pertinent information for each Example.

TABLE 32.1

Ingredients used in Examples 32–34 and Comparative Example E

| Example | Emulsion polymer of Example No. | Weight % Alkoxylated amine, based on Polymer | Alkoxylated amine |
|---|---|---|---|
| Comparative E | 6 | 4% | Ethox SAM-50 |
| 32 | 3 | 4% | Ethox SAM-50 |
| 33 | 6 + 3 65/35, by wt. | 4% | Ethox SAM-50 |
| 34 | 6 + 3 50/50, by wt. | 4% | Ethox SAM-50 |

EXAMPLE 35 and Comparative Examples F–G

Preparation of Aqueous Coating Compositions

Comparative Example F was prepared using by adding 28.02 g emulsion polymer of Example 6 to 32.5 g acrylic latex polymer (RHOPLEX AC-1801, Rohm and Haas Company) while stirring. To this mixture was added 137.5 g water and 2 g TEXANOL coalescent. Comparative Example G was prepared in a similar manner using 28.98 g emulsion polymer of Example 3, 35.52 g acrylic latex polymer (RHOPLEX AC-1801), 2 g TEXANOL, and 136.5 g water. Example 42 was prepared in a similar manner using 25.89 g emulsion polymer of Example 3, 1.59 g 25% aqueous solution of Ethox™ SAM-50, 32.52 g acrylic latex polymer (RHOPLEX AC-1801), 2 g Texanol, and 138 g water.

EXAMPLE 36

Evaluation of Adhesion to Weathered Paint Chalk

Chalk adhesion was evaluated for the aqueous coating compositions using the following procedure. The aqueous coating compositions were applied using a brush over a weathered piece of aluminum siding which had a layer of chalk about 25 microns thick. Chalk is the remnants of the inorganic particles (metal oxides, various silicates, and possibly metal carbonates) that were used in the original paint.

The aqueous coating compositions were applied in two coats of 103 g/m$^2$ (1 gram per 15 in$^2$). The first coat was allowed to dry for two hours before application of the second coat. The coated panels were then dried for approximately 24 hours. The panels were then placed in a light water mist-containing cabinet for approximately 18 hours. After exposure to the water the painted panel was removed and allowed to dry under ambient conditions for 3 hours. ASTM cross hatch(X-hatch) tape pull test method D-3359 was used to evaluate the adhesion. The percent of coating retained after pulling off the tape was recorded. 100 indicates complete adhesion while 0 indicates complete removal. A value of 100 is desired; however, experience has shown that values of 20–25% or greater indicate acceptably good adhesion.

The adhesion data is given in tables 36.1–36.5.

TABLE 36.1

Effect of particle size of emulsion polymer on chalk adhesion of dried aqueous coating compositions of Examples 15–19 and Comparative Examples A–B

| Example | Particle size nm | Alkoxylated amine (SAM-50) wt. % based on polymer | X-hatch adhesion |
|---|---|---|---|
| 15 | 19 | 4% | 93% |
| 16 | 47 | 4% | 56% |
| 17 | 76 | 4% | 52% |
| 18 | 95 | 4% | 42% |
| 19 | 118 | 4% | 26% |
| Comparative A | 186 | 4% | 6% |
| Comparative B | 269 | 4% | 8% |

The dried aqueous coating compositions of Examples 15–19 of this invention having emulsion polymer particle sizes less than 120 nanometers exhibit good chalk adhesion relative to Comparative Examples A–B.

TABLE 36.2

Effect of alkoxylated amine level on chalk adhesion of dried aqueous coating compositions of Examples 17–22 and Comparative Example C

| Example | Particle size nm | Alkoxylated amine (SAM-50) wt. % based on polymer | X-hatch adhesion |
|---|---|---|---|
| 17 | 76 | 4% | 52% |
| 20 | 76 | 2% | 40% |
| 21 | 76 | 1% | 41% |
| 22 | 76 | 5% | 30% |
| Comparative C | 76 | 0% | 14% |

The dried aqueous coating compositions of Examples 17–22 of this invention having alkoxylated amine levels between 0.25–10 wt. % based on polymer weight exhibit good chalk adhesion relative to Comparative Example C.

TABLE 36.3

Effect of various alkoxylated amines on chalk adhesion of dried aqueous coating compositions of Examples 17 and 23–24 and Comparative Example C

| Example | Particle size nm | Alkoxylated amine level and type | X-hatch adhesion |
|---|---|---|---|
| 17 | 76 | 4% Ethox SAM-50 | 52% |
| 23 | 76 | 4% Ethomeen 18/25 | 50% |
| 24 | 76 | 4% Jeffamine M2070 | 36% |
| Comparative C | 76 | 0% | 14% |

The dried aqueous coating compositions of Examples 17 and 23–24 of this invention having alkoxylated amine levels between 0.25–10 wt. % based on polymer weight using various alkoxylated amines exhibit good chalk adhesion relative to Comparative Example C.

TABLE 36.4

Effect of emulsion polymer composition on chalk adhesion of dried aqueous coating compositions of Examples 17, 25 and 26–31 and Comparative Example D

| Example | Composition and Acid Number | Particle size nm | Wt. % Alkoxylated amine | X-hatch adhesion |
|---|---|---|---|---|
| 17 | 55.7 BA/ 38.3 MMA/ 6 MAA  Acid No. = 39.06 | 76 | 4% Ethox SAM-50 | 52% |
| 25 | 51.2 EHA/ 38.3 MMA/ 7.98 MAA/ 2.5 STY  Acid No. = 51.95 | 45 | 4% Ethox SAM-50 | 51% |
| Comp. D | 48.1 EHA/ 47.7 MMA/ 1.7 MAA/ 2.5 STY  Acid No. = 11.07 | 40 | 4% Ethox SAM-50 | 26% |
| 26 | 52 EA/ 38.7 MMA/ 8 AAEM/ 1.3 MAA  Acid No. = 8.46 | 80 | 4% Ethox SAM-50 | 68% |
| 27 | 30.6 BA/ 68.3 VA/ 1.1 AA  Acid No. = 8.56 | 78 | 4% Ethox SAM-50 | 32% |
| 28 | 55.7 BA/ 20 MMA/ 18.3 Sty/6 MAA  Acid No. = 39.06 | 78 | 4% Ethox SAM-50 | 32% |
| 29 | 50.5 BA/ 35.5 MMA/ 8 AAEM/ 6 MAA  Acid No. = 39.06 | 83 | 4% Ethox SAM-50 | 43% |
| 30 | 50.5 BA/ 35.5 MMA/ 8 AAEM/ 6 MAA  Acid No. = 39.06 | 83 | 4% Jeff. M-2070 | 33% |
| 31 | 31.2 BA/ 62.8 VA/ 6 MAA  Acid No. = 39.06 | 88 | 4% Ethox SAM-50 | 64% |

The dried aqueous coating compositions of Examples 17, 25, and 28 of this invention incorporating emulsion polymers formed from nonionic monomers having a water solubility of less than 8% and having an acid number greater of 30 to 100 exhibit good chalk adhesion relative to Comparative Example D. The dried aqueous coating compositions of Examples 26–27 and 29–31 of this invention incorporating emulsion polymers formed 8–99.5%, by weight based on emulsion polymer weight, of a copolymerized ethylenically unsaturated first nonionic monomer having a water solubility of 8% or more and having an acid number greater of 4 to 100 exhibit good chalk adhesion.

TABLE 36.5

Effect of blending emulsion polymers having particle sizes greater than 120 nanometers with aqueous coating compositions of this invention on chalk adhesion of dried aqueous coating compositions of Examples 33–34

| Example | Particle size nm | Wt. % alkoxylated amine Ethox SAM-50 | X-hatch adhesion |
|---|---|---|---|
| Comparative E | 186 | 4% | 3% |
| 32 | 47 | 4% | 33% |
| 33 | 25 wt. % 47 + 75 wt. % 186 | 4% | 21% |
| 34 | 50 wt. % 47 + 50 wt. % 186 | 4% | 42% |

The dried aqueous coating compositions of Examples 33–34 of this invention exhibit good chalk adhesion when an emulsion polymer of this invention makes up at least 25% by weight of the total emulsion polymers used in the coating.

EXAMPLE 37

Evaluation of Adhesion to a Cementitious Surface

A substrate simulating a weathered, chalky cementitious surface and/or a poorly consolidated cementitious surface was prepared. 24 grams of a 2% aqueous solution of hydroxyethyl cellulose (Natrosol™ 250 MBR), 7 grams $TiO_2$, 60 grams $CaCO_3$, and 9 grams water were mixed on a high speed disperser. A 100 micron thick wet film of the material was applied to a glass plate and allowed to dry for 48 hours at 50% relative humidity and 23° C. Then a 100 micron wet film thickness of aqueous coating composition was applied to the substrate. This coating was allowed to dry for 7 days. ASTM cross hatch tape pull test method D-3359 was then used to evaluate the adhesion. The values are presented in Table 44.1 as percent coating retained.

TABLE 44.1

Simulated cementitious surface adhesion of dried aqueous coating compositions of Example 35 and Comparative Examples F–G

| Example | Particle size nm | Wt. % alkoxylated amine (Ethox SAM-50) | X-hatch adhesion |
|---|---|---|---|
| Comparative F | 269 | 0% | 40% |
| Comparative G | 47 | 0% | 60% |
| 35 | 47 | 4% | 90% |

The dried aqueous coating compositions of Example 35 of this invention exhibits superior cementitious surface adhesion relative to Comparative Samples F–G.

What is claimed is:

1. An aqueous coating composition having improved adhesion to friable surfaces comprising an aqueous emulsion polymer having a glass transition temperature of −20° C. to 100° C. and an average particle diameter less than 120 nanometers, said emulsion polymer consisting essentially of at least one copolymerized ethylenically unsaturated nonionic monomer, each of said nonionic monomer(s) having a water solubility less than 8%, and at least one copolymerized acid monomer, such that the acid number of said emulsion polymer is 30 to 100; and 0.25–10%, by weight based on said emulsion polymer weight, water-soluble alkoxylated amine.

2. The coating composition of claim 1 wherein the acid number of said emulsion polymer is 39 to 50.

3. The coating composition of claim 1 wherein the average particle diameter of said emulsion polymer is less than 80 nanometers.

4. An aqueous coating composition having improved adhesion to friable surfaces comprising an aqueous emulsion polymer having a glass transition temperature of −20° C. to 100° C. and an average particle diameter less than 120 nanometers, said emulsion polymer consisting essentially of 8–99.5%, by weight based on said emulsion polymer weight, of at least one copolymerized ethylenically unsaturated first nonionic monomer, each of said first nonionic monomer(s) having a water solubility of 8% or more, 0–91.5%, by weight based on said emulsion polymer weight, of at least one copolymerized ethylenically unsaturated second nonionic monomer, each of said second nonionic monomer(s) having a water solubility of less than 8%, and at least one copolymerized acid monomer, such that the acid number of said emulsion polymer is 4 to 100; and 0.25–10%, by weight based on said emulsion polymer weight, water-soluble alkoxylated amine.

5. The coating composition of claim 4 wherein the average particle diameter of said emulsion polymer is less than 80 nanometers.

* * * * *